(12) United States Patent
Graham et al.

(10) Patent No.: US 10,962,345 B2
(45) Date of Patent: Mar. 30, 2021

(54) TOOL AND METHOD FOR INSPECTING AN ANNULAR SPACE OF AN ENGINE

(71) Applicant: General Electric Company, Schenectady, NY (US)

(72) Inventors: Andrew Crispin Graham, Badminton (GB); David Scott Diwinsky, West Chester, OH (US)

(73) Assignee: General Electric Company, Schenectady, NY (US)

( * ) Notice: Subject to any disclaimer, the term of this patent is extended or adjusted under 35 U.S.C. 154(b) by 266 days.

(21) Appl. No.: 15/986,958

(22) Filed: May 23, 2018

(65) Prior Publication Data

US 2019/0360794 A1    Nov. 28, 2019

(51) Int. Cl.
  *G01M 15/14*    (2006.01)
  *G01B 5/213*    (2006.01)

(52) U.S. Cl.
  CPC .............. *G01B 5/213* (2013.01); *G01M 15/14* (2013.01)

(58) Field of Classification Search
  CPC .......... G01B 5/20; G01B 5/201; G01B 5/205; G01B 5/213; G01M 15/14
  USPC ...................................................... 73/112.01
  See application file for complete search history.

(56) References Cited

U.S. PATENT DOCUMENTS

| | | |
|---|---|---|
| 3,270,641 A | 9/1966 | Gosselin |
| 4,730,960 A * | 3/1988 | Lewis .................... B25B 13/06 408/127 |
| 5,203,646 A | 4/1993 | Landsberger et al. |
| 5,323,962 A | 6/1994 | Jassby et al. |
| 5,385,102 A | 1/1995 | Villedieu et al. |
| 5,501,156 A | 3/1996 | Richter |
| 6,287,206 B1 * | 9/2001 | Stage ....................... F16D 3/16 464/119 |
| 6,481,195 B1 | 11/2002 | Blase |
| 6,643,877 B1 * | 11/2003 | Amtenbrink ........ B25B 23/0035 7/125 |
| 7,182,024 B2 | 2/2007 | Pfeiffer |
| 7,185,407 B2 | 3/2007 | Boyl-Davis et al. |
| 7,258,521 B2 | 8/2007 | Guerra et al. |
| 7,677,181 B2 | 3/2010 | Boyl-Davis et al. |
| 9,016,159 B2 | 4/2015 | Kell et al. |
| 9,399,299 B2 | 7/2016 | Hermey et al. |

(Continued)

OTHER PUBLICATIONS

European Search Report Corresponding to Application No. 19175361 dated Oct. 21, 2019.

*Primary Examiner* — Eric S. McCall
(74) *Attorney, Agent, or Firm* — Dority & Manning, P.A.

(57) ABSTRACT

A tool for inspecting an annular section of an engine includes a first segment extending along a first lengthwise direction between a forward end and an aft end; and a second segment extending along a second lengthwise direction between a forward end and an aft end, the forward end of the first segment pivotably coupled to the aft end of the second segment and the first segment moveable relative to the second segment between a bent position and a coupled position, the first lengthwise direction defining a coupled angle with the second lengthwise direction when the first segment is in the coupled position relative to the second segment. The tool also includes an adjustment member operable with the first segment, the second segment, or both to adjust the coupled angle defined by the first lengthwise direction with the second lengthwise direction.

21 Claims, 8 Drawing Sheets

(56) References Cited

U.S. PATENT DOCUMENTS

| | | | |
|---|---|---|---|
| 9,409,292 | B2 | 8/2016 | Smith et al. |
| 9,435,750 | B2 | 9/2016 | Matsumoto |
| 9,458,735 | B1* | 10/2016 | Diwinsky ............ F01D 21/003 |
| 2006/0074383 | A1 | 4/2006 | Boulais |
| 2008/0199304 | A1 | 8/2008 | Moran et al. |
| 2011/0303053 | A1* | 12/2011 | Schneider ........... B25B 23/0021 |
| | | | 81/177.2 |
| 2012/0125164 | A1* | 5/2012 | Kozak ................... B23B 45/005 |
| | | | 81/177.6 |
| 2012/0312103 | A1 | 12/2012 | Hannott et al. |
| 2013/0335530 | A1* | 12/2013 | Hatcher, Jr. ........... F01D 21/003 |
| | | | 348/46 |
| 2014/0005683 | A1* | 1/2014 | Stand ................... A61B 1/0057 |
| | | | 606/130 |
| 2014/0012288 | A1* | 1/2014 | Darisse ................ A61B 1/0055 |
| | | | 606/130 |
| 2015/0300920 | A1* | 10/2015 | DeAscanis ............ F01D 21/003 |
| | | | 356/614 |
| 2015/0338353 | A1* | 11/2015 | Bancalari ............. G01N 21/954 |
| | | | 348/82 |
| 2015/0341600 | A1* | 11/2015 | Hatcher, Jr. ............ H04N 7/183 |
| | | | 348/82 |
| 2016/0040803 | A1 | 2/2016 | Steeger |
| 2017/0023154 | A1 | 1/2017 | Jaeker et al. |
| 2017/0100197 | A1* | 4/2017 | Zubiate ............... A61B 17/3417 |
| 2017/0167289 | A1* | 6/2017 | Diwinsky ........... G02B 23/2484 |
| 2017/0219814 | A1* | 8/2017 | Letter ................... G01M 15/02 |
| 2017/0219815 | A1* | 8/2017 | Letter ................ H04N 5/23238 |
| 2017/0361470 | A1 | 12/2017 | Otero Del Real et al. |
| 2018/0119568 | A1* | 5/2018 | Negoescu ............. F01D 21/003 |
| 2019/0277770 | A1* | 9/2019 | Mekala ................ G01N 21/954 |
| 2019/0383158 | A1* | 12/2019 | Diwinsky ........... G02B 23/2484 |

* cited by examiner

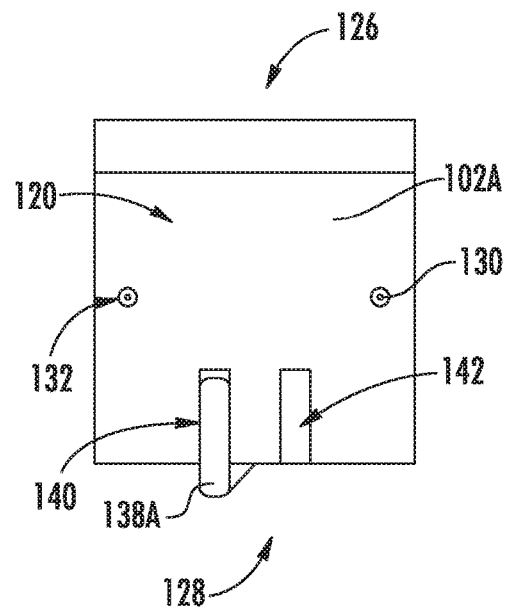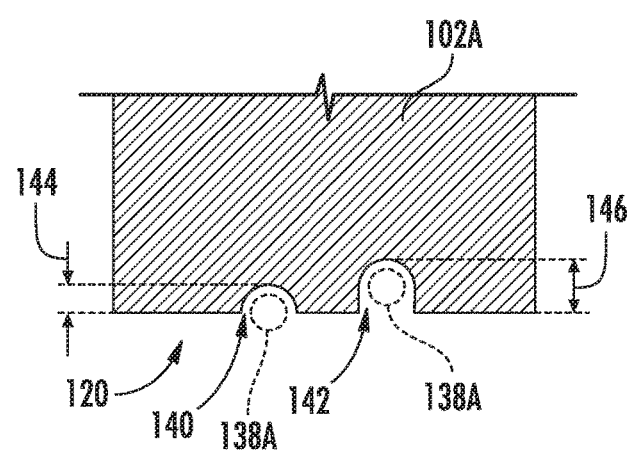
FIG. 6      FIG. 7
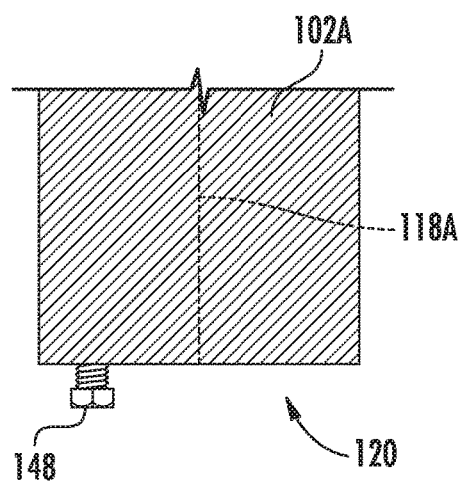
FIG. 8

TOOL AND METHOD FOR INSPECTING AN ANNULAR SPACE OF AN ENGINE

FIELD

The present subject matter relates generally to a tool and method for inspecting an annular space, such as an annular space in a turbine engine.

BACKGROUND

At least certain gas turbine engines include, in serial flow arrangement, a compressor section including a low pressure compressor and a high-pressure compressor for compressing air flowing through the engine, a combustor for mixing fuel with the compressed air such that the mixture may be ignited, and a turbine section including a high pressure turbine and a low pressure turbine for providing power to the compressor section.

Within one or more of the sections, at least certain gas turbine engines define an annular opening. Certain of these annular openings may vary in size, such that a dedicated, specialized inspection tool must be utilized with each annular opening to extend around and through such annular opening. Maintaining inspection tools for each of the various annular openings may be expensive and inconvenient. Accordingly, an inspection tool for inspecting annular openings of varying sizes within, e.g., a gas turbine engine, would be useful.

BRIEF DESCRIPTION

Aspects and advantages of the invention will be set forth in part in the following description, or may be obvious from the description, or may be learned through practice of the invention.

In one embodiment of the present disclosure, a tool for inspecting an annular section of an engine is provided. The tool includes a first segment extending along a first lengthwise direction between a forward end and an aft end; and a second segment extending along a second lengthwise direction between a forward end and an aft end, the forward end of the first segment pivotably coupled to the aft end of the second segment and the first segment moveable relative to the second segment between a bent position and a coupled position, the first lengthwise direction defining a coupled angle with the second lengthwise direction when the first segment is in the coupled position relative to the second segment. The tool also includes an adjustment member operable with the first segment, the second segment, or both to adjust the coupled angle defined by the first lengthwise direction with the second lengthwise direction.

In certain embodiments the first segment defines an outer side and an inner side, wherein the second segment defines an outer side and an inner side, and wherein the forward end of the first segment is pivotably coupled to the aft end of the second segment at their respective outer sides, and wherein the adjustment member is operable with the inner side of the first segment, the inner side of the second segment, or both.

In certain embodiments the first segment defines a first indentation at the forward end and a second indentation at the forward end, and wherein the adjustment member is positioned at least partially within the first indentation or the second indentation to adjust the coupled angle.

For example, in certain exemplary aspects the first indentation defines a first depth, wherein the second indentation defines a second depth, and wherein the first depth is not equal to the second depth.

For example, in certain exemplary aspects the adjustment member is a bar coupled to the first segment and positioned at least partially within the first indentation or the second indentation of the first segment.

In certain embodiments the adjustment member is a rotatably extendable member coupled to the forward end of the first segment.

In certain embodiments the coupled angle defined by the first lengthwise direction with the second lengthwise direction is less than 180 degrees, and wherein the first lengthwise direction further defines a bent angle with the second lengthwise direction greater than 180 degrees when the first segment is in the bent position relative to the second segment.

In certain summary aspects, the tool may further include a biasing member operable with the first segment and the second segment to bias the first segment towards the coupled position relative to the second segment.

In certain summary aspects, the tool may further include an insertion tube defining a substantially 90 degree bend, wherein the first segment and the second segment are moveable through the insertion tube, and wherein the first segment is positioned in the bent position relative to the second segment when moved through the substantially 90 degree bend of the insertion tube.

In certain summary aspects, the tool may further include a third segment extending along a third lengthwise direction between a forward end and an aft end, the forward end of the second segment pivotably coupled to the aft end of the third segment, the second segment moveable relative to the third segment between a bent position and a coupled position, the second lengthwise direction defining a coupled angle with the third lengthwise direction when the first segment is in the coupled position relative to the second segment.

For example, in certain exemplary aspects the adjustment member is a first adjustment member, and the tool further includes a second adjustment member operable with the second segment, the third segment, or both to adjust the coupled angle defined by the second lengthwise direction with the third lengthwise direction.

For example, in certain exemplary aspects the coupled angle defined by the first lengthwise direction with the second lengthwise direction is not equal to the coupled angle defined by the second lengthwise direction with the third lengthwise direction.

In one exemplary aspect of the present disclosure a method is provided for inspecting an annular section of an engine using a tool including a plurality of segments and an adjustment member, the plurality of segments including a first segment and a second segment and the adjustment member operable with the first segment, the second segment, or both. The method includes: determining a control radius of the annular section of the engine; and setting the adjustment member of the tool to adjust a coupled angle defined by the first segment relative to the second segment based on the determined control radius of the annular section of the engine.

In certain exemplary aspects determining the control radius of the annular section of the engine includes determining an inspection radius of the annular section of the engine.

For example in certain exemplary aspects setting the adjustment member of the tool includes setting the adjustment member of the tool such that an average arc shape of the plurality of segments defines a radius of curvature substantially equal to the inspection radius of the annular section of the engine.

In certain exemplary aspects setting the adjustment member of the tool includes setting a first adjustment member of the tool to adjust a first coupled angle defined by the first segment relative to the second segment, wherein the plurality of segments further includes a third segment and a fourth segment, and wherein setting the adjustment member of the tool includes setting a plurality of adjustment members of the tool to further adjust a second coupled angle defined by the second segment relative to the third segment and a third coupled angle defined by the third segment relative to the fourth segment.

In certain exemplary aspects the method may further include inserting the first and second segments into the annular section of the engine.

In another exemplary embodiment of the present disclosure a tool is provided for inspecting an annular section of an engine, the annular section of the engine defining an inspection radius. The tool includes a plurality of segments moveably coupled to one another, each segment moveable relative to an adjacent segment between a bent position and a coupled position, the plurality of segments defining an average arc shape when each segment is in its respective coupled position, the average arc shape defining a radius of curvature substantially equal to the inspection radius.

In certain exemplary embodiments, the tool further includes an insertion tube defining a substantially 90 degrees bend, wherein the plurality of segments are moveable through the insertion tube, and wherein each segment is in the bent position when moved through the substantially 90 degree bend of the insertion tube.

In certain exemplary embodiments, the tool further includes a biasing member operable with at least two segments of the plurality of segments, the biasing member configured to bias at least one segment of the at least two segments towards the coupled position.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 6 is an end view of a segment of the exemplary inspection tool of FIG. 4 in accordance with an exemplary aspect of the present disclosure.

FIG. 7 is a close-up, cross-sectional view of the exemplary segment of FIG. 6.

FIG. 8 is a close-up, cross-sectional view of a segment of an inspection tool in accordance with another exemplary embodiment of the present disclosure.

DETAILED DESCRIPTION

Figure 1:
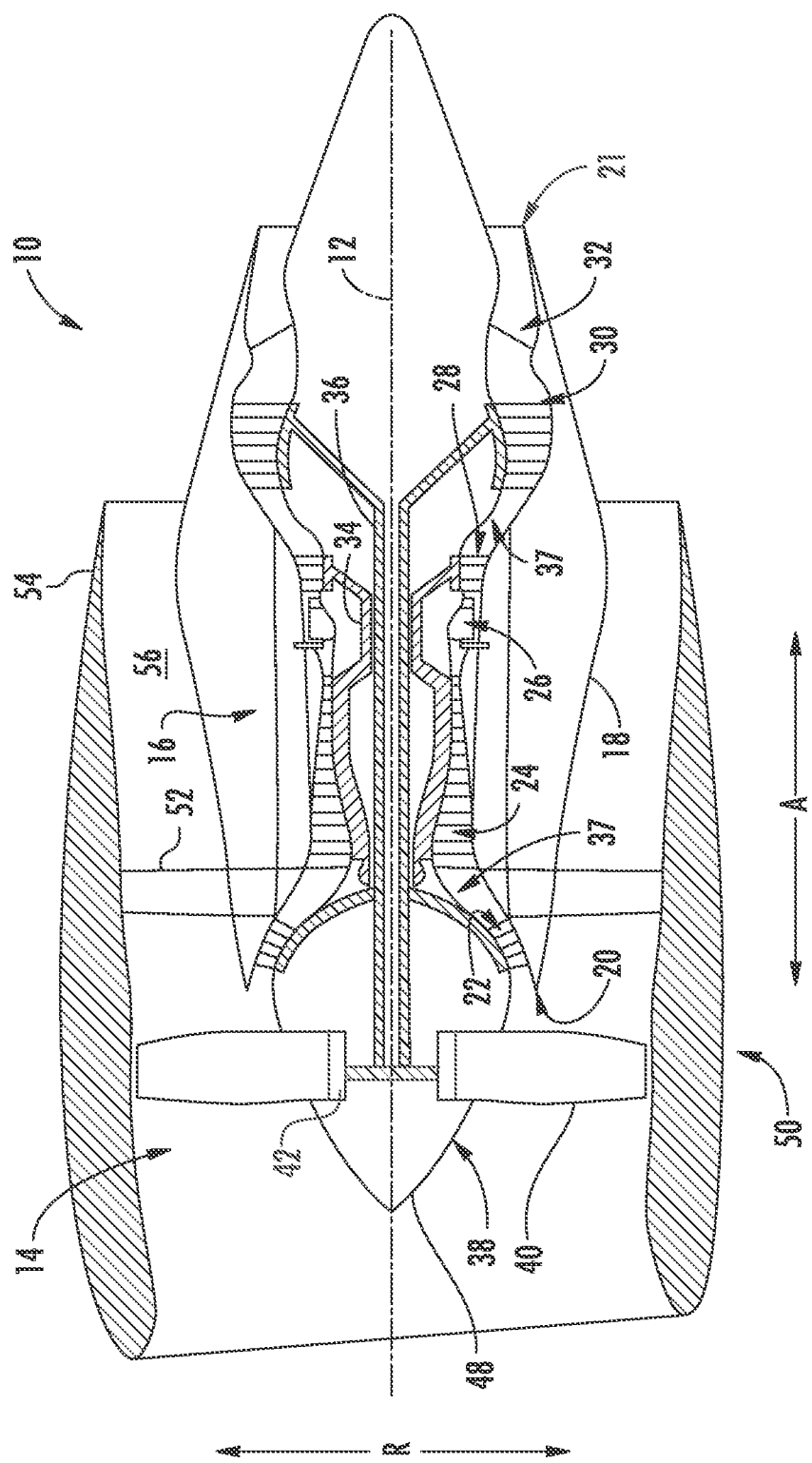
FIG. 1 is a schematic, cross-sectional view of a gas turbine engine in accordance with an exemplary aspect of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components.

The terms "forward" and "aft" refer to relative positions of a component or system. For example, with respect to a gas turbine engine, these terms refer to the normal operational attitude of the gas turbine engine or vehicle (e.g., with forward referring to a position closer to an engine inlet and aft referring to a position closer to an engine nozzle or exhaust). Similarly, with other components, these terms refer to a normal operational attitude of the component, such that forward refers to a position closer to a leading end and aft refers to a position closer to a trailing end.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R. The turbofan engine 10 also defines a circumferential direction C (see FIG. 3) extending circumferentially about the axial direction A. In general, the turbofan 10 includes a fan section 14 and a turbomachine 16 disposed downstream from the fan section 14.

The exemplary turbomachine 16 depicted is generally enclosed within a substantially tubular outer casing 18 that defines an annular inlet 20 and an annular exhaust 21. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. The compressor section, combustion section 26, turbine section, and nozzle section 32 together define a core air flowpath 37 therethrough.

For the embodiment depicted, the fan section 14 includes a fixed pitch fan 38 having a plurality of fan blades 40. The fan blades 40 are each attached to a disk 42, with the fan blades 40 and disk 42 together rotatable about the longitudinal axis 12 by the LP shaft 36. For the embodiment depicted, the turbofan engine 10 is a direct drive turbofan engine, such that the LP shaft 36 drives the fan 38 of the fan section 14 directly, without use of a reduction gearbox. However, in other exemplary embodiments of the present disclosure, the fan 38 may instead be a variable pitch fan, and the turbofan engine 10 may include a reduction gearbox, in which case the LP shaft 36 may drive the fan 38 of the fan section 14 across the gearbox.

Referring still to the exemplary embodiment of FIG. 1, the disk 42 is covered by rotatable front hub 48 aerodynamically contoured to promote an airflow through the plurality of fan blades 40. Additionally, the exemplary turbofan engine 10 includes an annular nacelle assembly 50 that circumferentially surrounds the fan 38 and/or at least a portion of the turbomachine 16. For the embodiment depicted, the nacelle assembly 50 is supported relative to the turbomachine 16 by a plurality of circumferentially-spaced outlet guide vanes 52. Moreover, a downstream section 54 of the nacelle assembly 50 extends over an outer portion of the casing 18 so as to define a bypass airflow passage 56 therebetween. The ratio between a first portion of air through the bypass airflow passage 56 and a second portion of air through the inlet 20 of the turbomachine 16, and through the core air flowpath 37, is commonly known as a bypass ratio.

It will be appreciated that although not depicted in FIG. 1, the turbofan engine 10 may further define a plurality of openings allowing for inspection of various components within the turbomachine 16. For example, the turbofan engine 10 may define a plurality of borescope openings at various axial positions within the compressor section, combustion section 26, and turbine section. Additionally, as will be discussed below, the turbofan engine 10 may include one or more igniter ports within, e.g., the combustion section 26 of the turbomachine 16, that may allow for inspection of the combustion section 26.

It should further be appreciated that the exemplary turbofan engine 10 depicted in FIG. 1 is by way of example only, and that in other exemplary embodiments, the turbofan engine 10 may have any other suitable configuration, including, for example, any other suitable number of shafts or spools, turbines, compressors, etc. Additionally, or alternatively, in other exemplary embodiments, any other suitable turbine engine may be provided. For example, in other exemplary embodiments, the turbine engine may not be a turbofan engine, and instead may be configured as a turboshaft engine, a turboprop engine, turbojet engine, etc.

Figure 2:
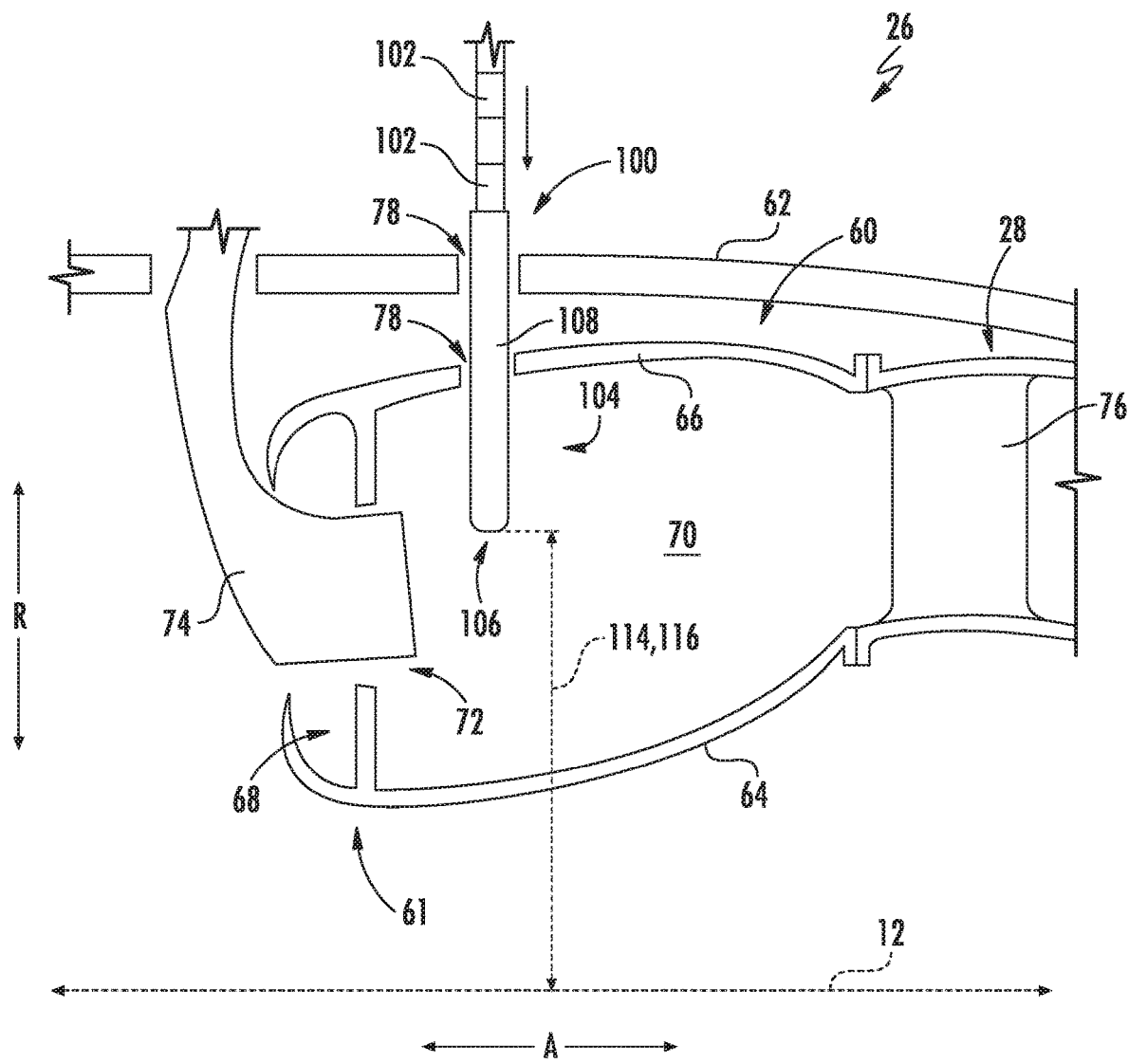
FIG. 2 is a close-up, cross-sectional view of a combustion section of the exemplary gas turbine engine of FIG. 1 including an inspection tool in accordance with an exemplary embodiment of the present disclosure, along an axial direction and a radial direction.

Referring now to FIG. 2, a close-up, schematic view of the combustion section 26 of the turbomachine 16 of the exemplary gas turbine engine 10 of FIG. 1 is provided.

As is depicted, the combustion section 26 generally includes a combustor 60 positioned within a combustor casing 62. Additionally, the combustor 60 includes an inner liner 64, an outer liner 66, and a dome 68 together defining at least in part a combustion chamber 70. It will be appreciated that the dome 68, for the embodiment depicted, is an annular dome and the combustor 60 is configured as an annular combustor. In such a manner, the combustion chamber 70 generally defines an annular shape. At a forward end 61, the combustor 60 defines, or rather, the dome 68 defines, a nozzle opening 72, and the combustion section 26 further includes a fuel-air mixer 74, or nozzle, positioned within the nozzle opening 72. The fuel-air mixer 74 is configured to provide a mixture of fuel and compressed air to the combustion chamber 70 during operation of the turbofan engine 10 to generate combustion gases. The combustion gases flow from the combustion chamber 70 to the HP turbine 28, and more specifically, through a plurality of inlet guide vanes 76 of the HP turbine 28.

Notably, although a single nozzle opening 72 and fuel-air mixer 74 is depicted in FIG. 2, the combustor 60 may further include a plurality of circumferentially spaced nozzle openings 72 and a respective plurality of fuel-air mixers 74 positioned within the nozzle openings 72.

In order to initiate a combustion of the fuel and compressed air provided to the combustion chamber 70 by the fuel-air mixer 74, the combustion section 26 typically includes an igniter (not installed or depicted) extending through a pair of igniter openings 78 defined in the combustor casing 62 and the outer liner 66 of the combustor 60. However, when the turbofan engine 10 is not operating, the igniter may be removed and the igniter openings 78 may be utilized for inspecting, e.g., the combustion chamber 70, inlet guide vanes 76 of the HP turbine 28, and/or other components.

Figure 3:
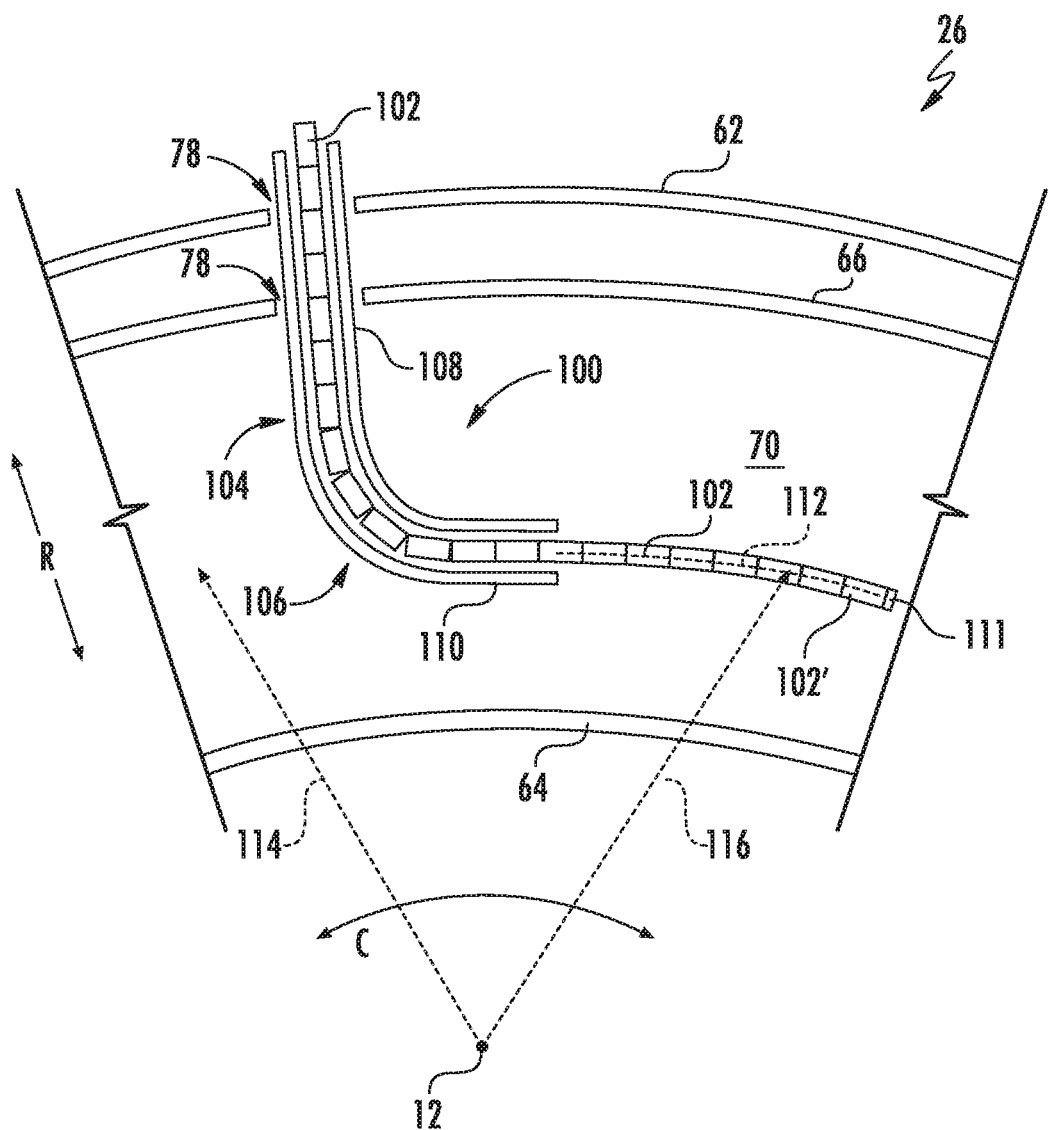
FIG. 3 is another close-up, cross-sectional view of the combustion section of the exemplary gas turbine engine of FIG. 1 including the exemplary inspection tool, along the radial direction and a circumferential direction.

More specifically, for the embodiment of FIG. 2, a tool 100 for inspecting an annular section of an engine in accordance with an exemplary embodiment of the present disclosure is depicted extending through the pair of igniter openings 78 defined in the combustor casing 62 and the outer liner 66 of the combustor 60. Referring now also to FIG. 3, providing a partial, axial cross-sectional view of the combustion section 26 of FIG. 2, it will be appreciated that the tool 100 generally includes a plurality of segments 102 and an insertion tube 104, with the plurality of segments 102 movable through the insertion tube 104 into the combustion chamber 70.

More specifically, for the exemplary embodiment depicted, the insertion tube 104 includes a bend 106. For the embodiment shown, the bend 106 is a substantially 90 degree bend. For example, the insertion tube 104 includes a radial portion 108 extending substantially along the radial direction R and a circumferential portion 110 extending substantially along the circumferential direction C. The radial portion 108 and circumferential portion 110 are joined at the bend 106. The plurality of segments 102 are fed through the radial portion 108, pivot backwards relative to one another to go through the bend 106, and then couple relative to one another as they move through to the circumferential portion 110. From the circumferential portion 110, the segments 102 extend through the annular combustion chamber 70. A forward-most segment 102' includes a camera 111, for the embodiment depicted, to allow user to inspect various components of the combustor 60 and/or high pressure turbine 28.

As will be described in more detail below, the plurality of segments 102 of the tool 100 extending through the annular combustion chamber 70 together define an average arc shape 112 (i.e., an average arc line). Additionally, the annular combustion chamber 70 defines inspection radius 114, the inspection radius 114 being a distance along the radial direction R from which it is desired to view the annular section, i.e., annular combustion chamber 70, of the turbofan engine 10. For example, the inspection radius 114 may be a radial midpoint within the combustion chamber 70. Also, for the embodiment depicted, the average arc shape 112 of the plurality of segments 102 extending through the annular combustion chamber 70 (i.e., the plurality of segments 102 coupled to one another within the combustion chamber 70) defines a segment radius 116 (or "radius of curvature"), with the segment radius 116 of the average arc shape 112 being substantially equal to the inspection radius 114. Notably, the radius of curvature/segment radius 116 refers to the radius of a circle that aligns with the average arc shape 112 of the plurality of segments 102 extending through the annulus of the engine 10, which is the annular combustion chamber 70 for the embodiment depicted. As will further be discussed below, an angle between at least certain pair of adjacent segments 102 may be modified using one or more adjustment members 138 (see below) to tailor the average arc shape 112 and segment radius 116 to the desired inspection radius 114 of the annular portion being inspected. For example, in certain exemplary embodiments, the angle between at least certain pair of adjacent segments 102 may be modified to adjust the segment radius 116 by at least about five (5) inches, such as by at least about ten (10) inches or at least about fifteen (15) inches, and up to about seventy-five (75) inches. In such a manner, the tool 100 may be utilized within a relatively wide range of annuli. For example, the tool 100 may be configured to allow for an adjustment of the segment radius 116 of the above ranges to include segment radius 116 values of fifteen (15) inches, twenty (20) inches, thirty (30) inches, forty (40) inches, and/or fifty (50) inches.

Accordingly, it will be appreciated that although the tool 100 is depicted in FIGS. 2 and 3 as being used to inspect the combustion chamber 70, in other exemplary embodiments, the tool 100 may additionally, or alternatively, be used to inspect other areas of the turbofan engine 10 having different inspection radii 114. For example, the tool 100 may be utilized to inspect annular sections of the compressor section or the turbine section, or alternatively still, other engines or systems altogether.

Figure 4:
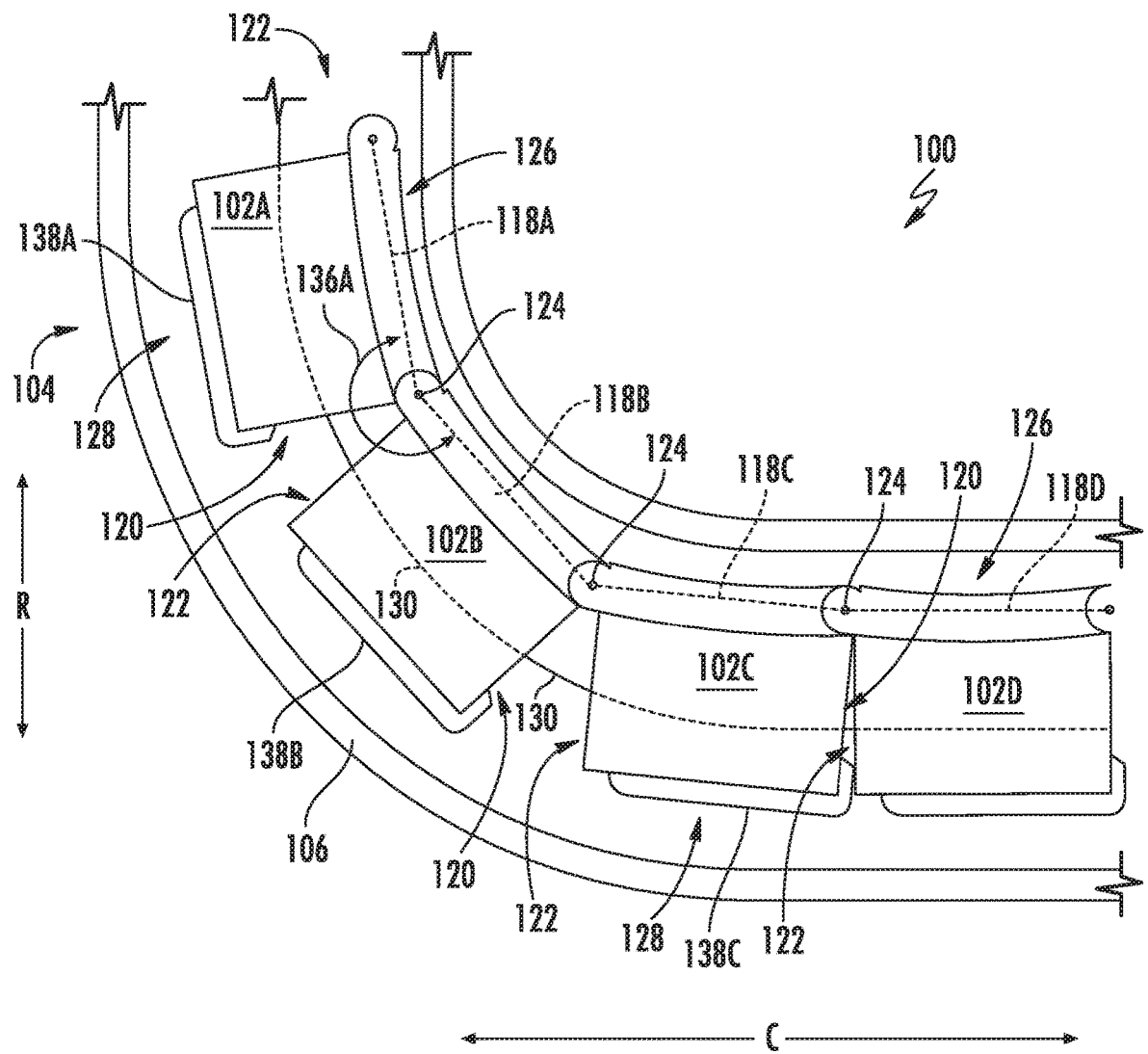
FIG. 4 is a close-up view of a portion of the exemplary inspection tool of FIG. 3.

Referring now to FIG. 4, a close-up view of a portion of the tool 100 of FIGS. 2 and 3 is provided. Specifically, FIG. 4 provides a close-up view of four segments 102 of the plurality of segments 102 of the tool 100 extending through the bend 106 of the insertion tube 104. The segments 102 generally include a first segment 102A, a second segment 102B, a third segment 102C, and a fourth segment 102D.

Each of the segments 102 extend generally along a respective lengthwise direction 118 between a forward end 120 and an aft end 122, with the aft end 122 of one segment 102 being pivotably coupled to the forward end 120 of an aft-adjacent segment 102, and the forward end 120 of the segment 102 being pivotably coupled to the aft end 122 of a forward-adjacent segment 102.

For example, the first segment 102A extends along a first lengthwise direction 118A between a forward end 120 and an aft end 122, the second segment 102B extends along a second lengthwise direction 118B between a forward end 120 and an aft end 122, the third segment 102C extends along a third lengthwise direction 118C between a forward end 120 and an aft end 122, and the fourth segment 102D extends along a fourth lengthwise direction 118D between a forward end 120 and an aft end 122. The forward end 120 of the first segment 102A is pivotably coupled to the aft end 122 of the second segment 102B, the forward end 120 of the second segment 102B is pivotably coupled to the aft end 122 of the third segment 102C, and the forward end 120 of the third segment 102C is pivotably coupled to the aft end 122 of the fourth segment 102D. It will be appreciated, that as used herein, the term "lengthwise direction" with respect to a particular segment 102 refers to a direction extending between pivot axes 124 at the forward end 120 and aft end 122 of the segment 102 where the segment 102 is coupled to the adjacent segments 102, in a plane perpendicular to these pivot axes 124.

Notably, each of the first segment 102A, second segment 102B, third segment 102C, and fourth segment 102D defines a respective outer side 126 and a respective inner side 128. The forward end 120 of the first segment 102A and the aft end 122 of the second segment 102B are pivotably coupled at their respective outer sides 126. Similarly, the forward end 120 of the second segment 102B and the aft end 122 of the third segment 102C are pivotably coupled at their respective outer sides 126, and the forward end 120 of the third segment 102C and the aft end 122 of the fourth segment 102D are pivotably coupled at their respective outer sides 126. It will be appreciated, however, that in other exemplary embodiments, the segments 102 may instead be pivotably coupled to one another at their respective inner sides 128, or a location between their respective outer and inner sides 126, 128.

Figure 5:
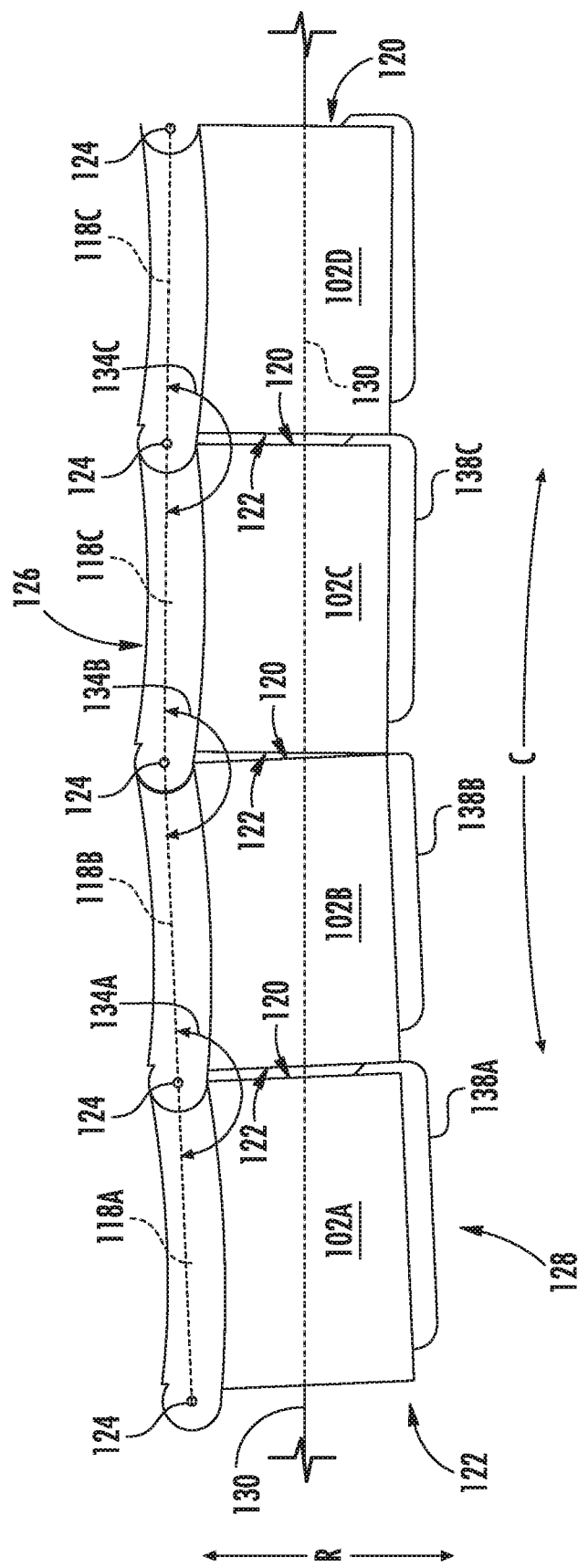
FIG. 5 is another close-up view of a portion of the exemplary inspection tool of FIG. 4.

Referring now also to FIG. 5, a close-up view of the plurality of segments 102 of FIG. 4 are depicted extending through the combustion chamber 70 (not labeled; see FIGS. 2 and 3). As is depicted in FIGS. 5 and 6, the tool 100 additionally includes a biasing member, and more specifically a tension member 130 configured to bias the segments 102 towards their respective coupled positions (discussed below). For the embodiment shown, the tension member 130 extends through the plurality of segments 102, and specifically, for the embodiment shown, through at least the first segment 102A, the second segment 102B, the third segment 102C, and the fourth segment 102D. As stated, the tension member 130 is configured to bias the segments 102 towards their respective coupled positions (discussed below), for example, to bias the first segment 102A towards the coupled position relative to the second segment 102B. For the embodiment shown, the tension member 130 is configured as a tension cable extending through openings 132 (see FIG. 6) within each of the segments 102 for providing a biasing force to press the segments 102 together.

Notably, however, in other embodiments, any other suitable tension member 130 may be provided. For example, in other embodiments, the tension member 130 may be a plurality of tension members 130, with each tension member 130 extending between a pair of adjacent segments 102 of the tool 100, or alternatively, with each tension member 130 extending from a base of the tool 100 to an individual segment 102 to provide the biasing of the individual segment 102 towards a coupled position relative to an aft-adjacent segment 102. Additionally, or alternatively, the tension member 130 may be a plurality of springs extending between adjacent segments 102, with each spring oriented axially to pull the segments 102 together, or torsionally to bendably bias the segments 102 towards each other by rotation about their respective axis 124. Further, in still other exemplary embodiments, the biasing member may not be a tension member 130, and instead may be any other suitable biasing member, such as one or more magnets and/or ferromagnetic materials.

Referring still the FIGS. 5 and 6, and particularly to the first and second segments 102A, 102B, it will be appreciated that the first segment 102A is movable relative to the second segment 102B between a bent position (FIG. 4) and a coupled position (FIG. 5). The first segment 102A defines a first coupled angle 134A with the second segment 102B when in the coupled position, and defines a first bent angle 136A with the second segment 102B within the bent position. More specifically, the first lengthwise direction 118A defines the first coupled angle 134A with the second lengthwise direction 118B when the first segment 102A is in the coupled position relative to the second segment 102B, and similarly defines the first bent angle 136A with the second lengthwise direction 118B when the first segment 102A is in the bent position relative to the second segment 102B. For the embodiment depicted, the first coupled angle 134A defined by the first lengthwise direction 118A with the second lengthwise direction 118B is less than 180 degrees, and the first bent angle 136A defined by the first lengthwise direction 118A with the second lengthwise direction 118B is greater than 180 degrees.

Similarly, the second segment 102B is movable relative to the third segment 102C between a bent position (FIG. 4) and a coupled position (FIG. 5), and the third segment 102C is movable relative to the fourth segment 102D between a bent position (not shown) and a coupled position (FIGS. 5 and 6). In such a manner, the second lengthwise direction 118B defines a second coupled angle 134B with the third lengthwise direction 118C when the second segment 102B is in the coupled position relative to the third segment 102C, and the third lengthwise direction 118C defines a third coupled angle 134C with the fourth lengthwise direction 118D when the third segment 102C is in the coupled position relative to the fourth segment 102D.

As briefly noted above, the average arc shape 112 (see FIG. 3) of the plurality of segments 102 extending through the combustion chamber 70 may be modified based on, e.g., a desired inspection radius 114 (see FIG. 3) of the annular section being examined. In order to provide such functionality, the tool 100 further includes an adjustment member 138 operable with the first segment 102A, the second segment 102B, or both to adjust the first coupled angle 134A defined by the first lengthwise direction 118A with the second lengthwise direction 118B. More specifically, for the exemplary aspect depicted, the adjustment member 138 is a first adjustment member 138A. The first adjustment member 138A is, for the embodiment depicted, operable with the inner side 128 of the first segment 102A, the inner side 128 of the second segment 102B, or both. More specifically, for the embodiment depicted, the first adjustment member 138A acts as a variable spacer between the forward end 120 of the first segment 102A and the aft end 122 of the second segment 102B at their respective inner sides 128 to adjust the first coupled angle 134A defined by the first lengthwise direction 118A with the second lengthwise direction 118B.

For example, referring briefly to FIG. 6, providing a view of the forward end 120 of the first segment 102A, it will be appreciated that the first segment 102A defines a first indentation 140 at the forward end 120 and a second indentation 142 also at the forward end 120. The first adjustment member 138A is positioned at least partially within the first indentation 140 or the second indentation 142 to adjust the first coupled angle 134A. More specifically, for the embodiment depicted, the first adjustment member 138A is configured as a bar coupled to the first segment 102A at the bottom side and extending into/positioned at least partially in the first indentation 140.

Moreover, referring now briefly to FIG. 7, providing a cross-sectional view of the forward end 120 of the first segment 102A, it will be appreciated that the first indentation 140 defines a first depth 144 and the second indentation 142 defines a second depth 146. The first depth 144 is not equal to the second depth 144, and more specifically, the first depth 144 is less than the second depth 146. The first adjustment member 138A is depicted in phantom in FIG. 7 in both the first indentation 140 and the second indentation 142. As is depicted, a diameter of the first adjustment member 138A is greater than the first depth 144, such that the first adjustment member 138A extends outwardly from the forward end 120 of the first segment 102A when positioned in the first indentation 140. By contrast, for the embodiment of FIG. 7, the diameter of the first adjustment member 138A is substantially equal to or less than the second depth 146 of the second indentation 142. Accordingly, when the first adjustment member 138A is positioned within the second indentation 142, the first adjustment member 138A is substantially flush with, or recessed from, the forward end 120 of the first segment 102A.

In such a manner, moving the first adjustment member 138A between the first indentation 140 and the second indentation 142 may adjust a separation between the forward end 120 of the first segment 102A and the aft end 122 of the second segment 102B at their respective inner sides 128, which may effectively adjust the first coupled angle 134A defined by the first lengthwise direction 118A with the second lengthwise direction 118B. Notably, although for the embodiment depicted, the first segment 102A defines two indentations at the forward end 120, in other embodiments, the first segment 102A may define any other suitable number or configuration of indentations, with each of such indentations having any suitable depth. Additionally, or alternatively, the indentations may be spaced between the inner side 128 and outer side 126, with the indentations closer to the outer side 126 providing greater separation due to their proximity to the axis 124. Further, in still other exemplary embodiments, the adjustment member 138 may have any other suitable configuration for adjusting the first coupled angle 134A defined by the first lengthwise direction 118A with the second lengthwise direction 118B. For example, referring briefly to FIG. 8, providing a cross-sectional view of another embodiment of a first segment 102A (from the same perspective as the view of FIG. 7), in other exemplary embodiments, the first adjustment member 138A may be a screw member 148 rotatably engaged with the first segment 102A, such that it is movable generally along the first lengthwise direction 118A to adjust the spacing between the forward end 120 of the first segment 102A and the aft end 122 of the second segment 102B at their respective inner sides 128 to adjust the first coupled angle 134A. Other configurations are contemplated as well.

Referring back to FIGS. 4 and 5, it will be appreciated that for the embodiment depicted, the tool 100 further comprises a second adjustment member 138B operable with the second segment 102B, the third segment 102C, or both, and a third adjustment member 138C operable with the third segment 102C, the fourth segment 102D, or both. The second adjustment member 138B is configured to adjust the second coupled angle 134B defined by the second lengthwise direction 118B with the third lengthwise direction 118C, and the third adjustment member 138C is configured to adjust the third coupled angle 134C defined by the third lengthwise direction 118C with the fourth lengthwise direction 118D. For the embodiment depicted, the second adjustment member 138B is positioned such that the first coupled angle 134A is not equal to the second coupled angle 134B. More specifically, the second coupled angle 134B is less than the first coupled angle 134A by virtue of the fact that the second adjustment member 138B is positioned to reduce a gap/spacing between the forward end 120 of the second component and the aft end 122 of the third component at their respective inner sides 128. It will be appreciated, however, that in other exemplary embodiments, the first coupled angle 134A may be equal to the second coupled angle 134B by moving the second adjustment member 138B (e.g., similar to the positioning of the third adjustment member 138C).

In such a manner, it will be appreciated that the inspection tool 100 may be adjusted such that the average arc shape 112 of the plurality of segments 102 of the tool 100 extending through the annular section of the engine defines a segment radius 116 (or "arc radius") that is substantially equal to a desired inspection radius 114 of such annular section of the engine. Specifically, by adjusting the adjustment members 138, and accordingly adjusting the respective coupled angles 134 between adjacent segments 102, the average arc shape 112 of the segments 102 may be modified. Notably, each of the plurality of adjustment members 138 may not necessarily be in the same position. For example, the adjustment members 138 may be varied between the plurality of segments 102 to result in the desired average arc shape 112.

It will be appreciated that in certain exemplary embodiments, the plurality of adjustment members 138 may be positioned prior to the insertion of the plurality of segments 102 into the annular section of the engine. However, in other exemplary aspects, the adjustment members 138 may be moved into position based on real-time data.

Figure 9:
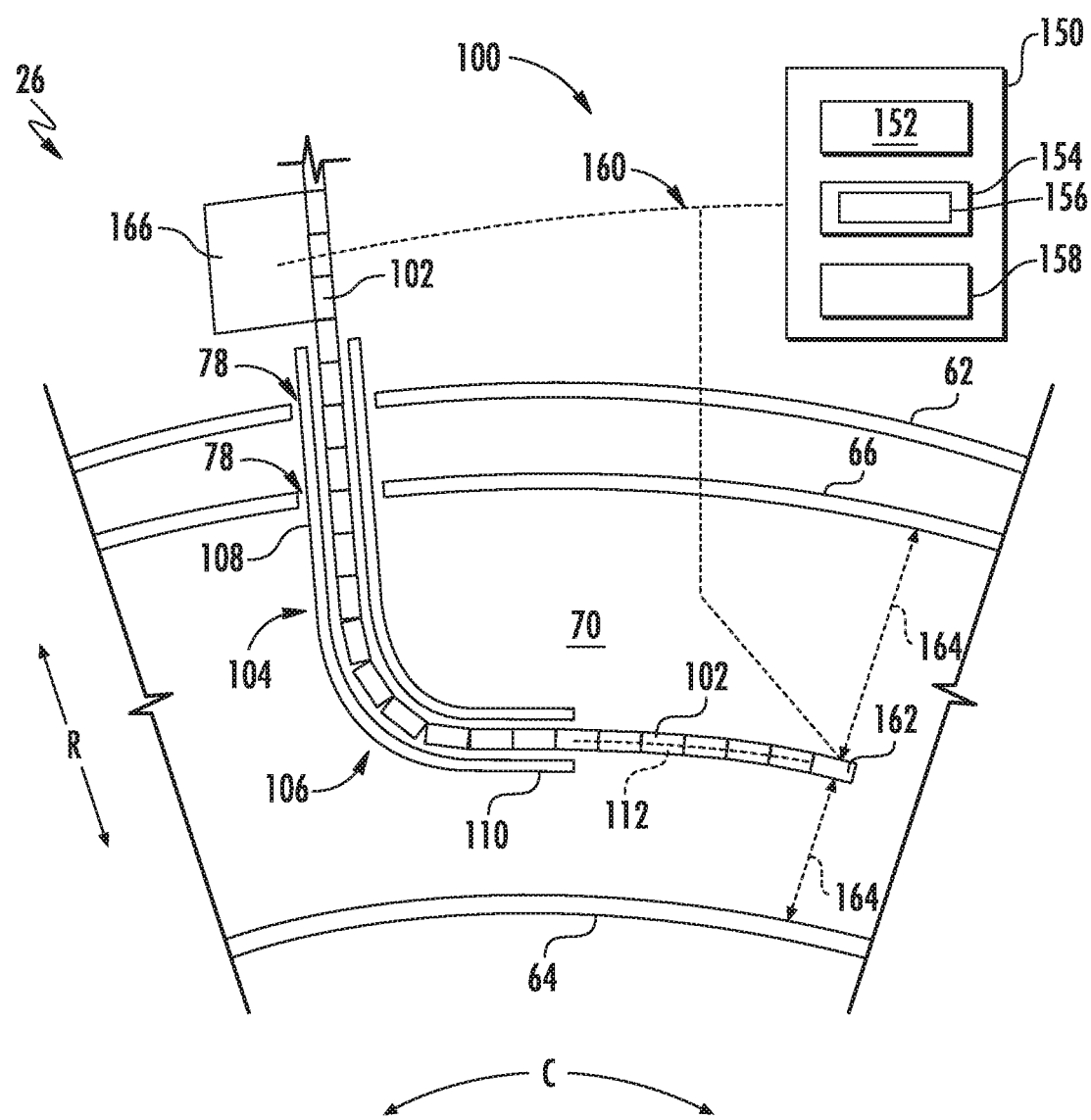
FIG. 9 is a close-up, cross-sectional view of a combustion section of a gas turbine engine including an inspection tool in accordance with another exemplary embodiment of the present disclosure, along a radial direction and a circumferential direction.

For example, referring briefly to FIG. 9, a schematic, axial view of a tool 100 positioned at least partially within an annular section of an engine, and more specifically, positioned at least partially within a combustion chamber 70 of a combustion section 26 of a turbofan engine 10, is provided. The tool 100 and combustion section 26 may be configured in substantially the same manner as the exemplary tool 100 and combustion section 26 depicted in FIG. 3, and described above. Accordingly, the tool 100 includes a plurality of segments 102 and an insertion tube 104. The tool 100 further includes a controller 150. The controller 150 has one or more processors 152 and memory 154. The memory 154 stores data 156. The data 156 may include instructions that, when executed by the one or more processors 152, cause the tool 100 to perform certain functions. One or more the functions may be one or more of the functions described below with reference to, e.g., the exemplary method 200. Additionally, the controller 150 includes a network interface 158. The network interface 158 may utilize any suitable wired or wireless communications network 160 to communicate with other components of the tool 100 and/or other components.

Referring still FIG. 9, a forward-most segment 102 of the plurality of segments 102 includes a position sensor 162. The position sensor 162 may be utilized to determine one or more distances 164, e.g., along a radial direction R to an inner liner 64 and/or an outer liner 66. The position sensor 162 is in communication with the controller 150 of the tool 100 though the communications network 160. The controller 150 may be configured to maintain the distances 164 of the forward-most segment 102 of the plurality of segments 102 of the tool 100 within a desired range of the inner liner 64, and/or the outer liner 66.

Further, the tool 100 includes a feeding mechanism 166 configured to move the plurality of segments 102 through the insertion tube 104 and into the annular combustion chamber 70. The feeding mechanism 166 is also in communication with the controller 150 through the network 160. The feeding mechanism 166 may be configured to move one or more adjustment members 138 of the tool 100 operable with one or more segments 102 of the plurality of segments 102 (see, e.g., FIGS. 4 through 8, described above). More specifically, the feeding mechanism 166 may be configured to move one or more adjustment members 138 in response to data received by the controller 150 from the sensor 162. In such a manner, the tool 100 may be configured to adjust the average arc shape 112 of the plurality of segments 102 being inserted into the annular chamber through the insertion tube 104 in response to a real-time measure of a position of one or more of the segments 102.

Notably, in certain embodiments, the feeding mechanism 166 may use a rotating wheel having a gripper surface (such as an elastomeric surface, or a geared surface corresponding to a geared surface of the segments 102) to feed the segments 102 into the insertion tube 104. Additionally, any suitable means may be provided with the feeding mechanism 166 to move the one or more adjustment members 138, such as a robotic switch, which is operable with the adjustment members 138 (i.e., configured to move the adjustment members 138 from one indentation to another).

Figure 10:
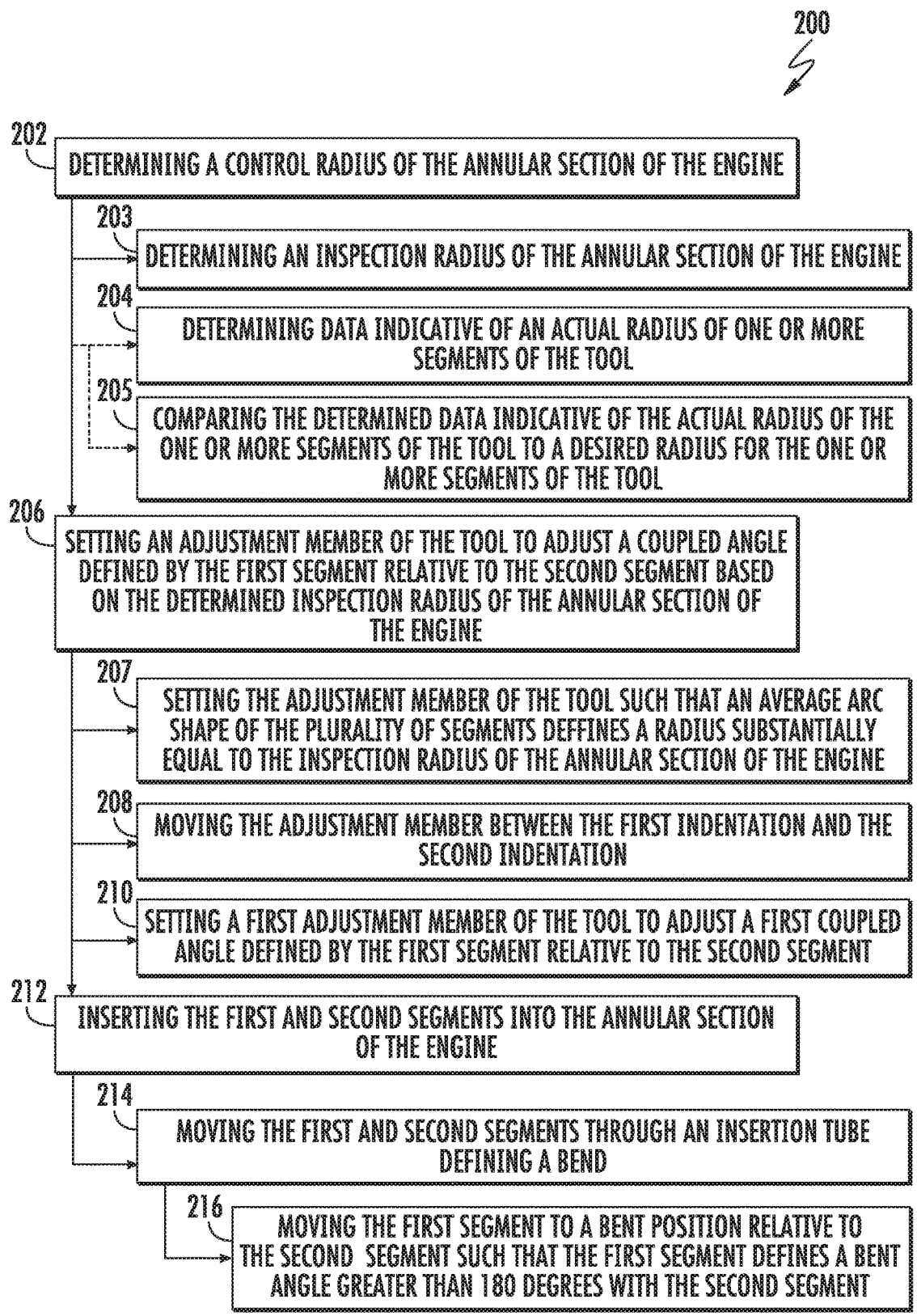
FIG. 10 is a flow diagram of a method for inspecting an annular section of an engine in accordance with an exemplary aspect of the present disclosure.

Referring now to FIG. 10, a method 200 for inspecting an annular section of an engine using a tool is provided. In certain exemplary aspects, the method 200 may utilize one or more the exemplary tools described above with reference to FIGS. 1 through 9. Accordingly, for example, the tool may include a plurality of segments and an adjustment member, the plurality of segments including a first segment and a second segment, and the adjustment member operable with the first segment, the second segment, or both.

The method 200 includes at (202) determining a control radius of the annular section of the engine. More specifically, for the exemplary aspect depicted, determining the control radius of the annular section of the engine at (202) includes at (203) determining an inspection radius of the annular section of the engine. The inspection radius of the annular section of the engine may be based on a known value for particular annular section of the engine.

It will be appreciated, however, that in other exemplary aspects, as is depicted in phantom, determining the control radius of the annular section of the engine at (202) may additionally, or alternatively, include at (204) determining data indicative of an actual radius of one or more segments of the tool and at (205) comparing the determined data indicative of the actual radius of the one or more segments of the tool at (204) to a desired radius for the one or more segments of the tool. Accordingly, in such an exemplary aspect, the control radius of the annular section of the engine may be a real-time measure of where the one or more segments of the tool are positioned relative to a desired location for the one or more segments (see, e.g., FIG. 9).

Referring still to FIG. 10, the method 200 further includes at (206) setting an adjustment member of the tool to adjust a coupled angle defined by the first segment relative to the second segment based on the determined control radius of the annular section of the engine (such as the determined inspection radius of the annular section of the engine). More specifically, for the exemplary aspect depicted, setting the adjustment member of the tool at (206) includes at (207) setting the adjustment member of the tool such that an average arc shape of the plurality of segments defines an arc radius substantially equal to the inspection radius of the annular section of the engine.

Notably, the coupled angle defined by the first segment relative to the second segment may be an angle defined by a lengthwise direction of the first segment with a lengthwise direction of the second segment.

Referring still to FIG. 10, for the exemplary aspect depicted, it will be appreciated that the first segment defines a first indentation and a second indentation at a forward end thereof, and further that the first segment is pivotably coupled to the second segment at the forward end. With such an exemplary aspect, setting the adjustment member of the tool to adjust the coupled angle defined by the first segment relative to the second segment at (206) further includes at (208) moving the adjustment member between the first indentation and the second indentation.

Moreover, for the exemplary aspect of FIG. 10, the plurality of segments of the tool further includes a third segment and a fourth segment. With such an exemplary aspect, setting the adjustment member of the tool at (206) includes at (210) setting a first adjustment member of the tool to adjust a first coupled angle defined by the first segment relative to the second segment. Additionally, with such an exemplary aspect, setting the adjustment member of the tool at (206) further includes setting a plurality of adjustment members of the tool to further adjust a second coupled angle defined by the second segment relative to the third segment and a third coupled angle defined by the third segment relative to the fourth segment.

Further, still, for the exemplary aspect of FIG. 10, the method 200 includes at (212) inserting the first and second segments into the annular section of the engine. More specifically, for the exemplary aspect depicted, inserting the first and second segments into the annular section of the engine at (212) includes at (214) moving the first and second segments through an insertion tube defining a bend. Further, moving the first and second segments through the insertion tube defining the bend at (214) includes at (216) moving the first segment to a bent position relative to the second segment such that the first segment defines a bent angle greater than 180 degrees with the second segment.

Subsequent to moving the first and second segments through the bend of the insertion tube, a tension member of the tool may automatically move, through a biasing force, the first segment to a coupled position, such that the first segment defines the coupled angle relative to the second segment.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A tool for inspecting an annular section of an engine, the tool comprising:
    a first segment extending along a first lengthwise direction between a forward end and an aft end and wherein the first segment defines an outer side and an inner side;
    a second segment extending along a second lengthwise direction between a forward end and an aft end and wherein the second segment defines an outer side and an inner side, the forward end of the first segment pivotably coupled to the aft end of the second segment at a pivot axis at the respective outer sides of the first segment and the second segment, and the first segment moveable relative to the second segment between a bent position and a coupled position, the first lengthwise direction defining a coupled angle with the second lengthwise direction when the first segment is in the coupled position relative to the second segment; and
    an adjustment member operable with the first segment, the second segment, or both to adjust the coupled angle defined by the first lengthwise direction with the second lengthwise direction and wherein the adjustment member is coupled to the inner side of the first segment, the inner side of the second segment, or both, wherein the adjustment member is a rotatably extendable member coupled to the forward end of the first segment.

2. The tool of claim 1, wherein the adjustment member is a bar coupled to the first segment and positioned at least partially within the first indentation or the second indentation of the first segment.

3. The tool of claim 1, wherein the coupled angle defined by the first lengthwise direction with the second lengthwise direction is less than 180 degrees, and wherein the first lengthwise direction further defines a bent angle with the second lengthwise direction greater than 180 degrees when the first segment is in the bent position relative to the second segment.

4. The tool of claim 1, further comprising:
    a biasing member operable with the first segment and the second segment to bias the first segment towards the coupled position relative to the second segment.

5. The tool of claim 1, further comprising:
    an insertion tube defining a substantially 90 degree bend, wherein the first segment and the second segment are moveable through the insertion tube, and wherein the first segment is positioned in the bent position relative to the second segment when moved through the substantially 90 degree bend of the insertion tube.

6. A tool for inspecting an annular section of an engine, the tool comprising:

a first segment extending along a first lengthwise direction between a forward end and an aft end and wherein the first segment defines an outer side and an inner side;

a second segment extending along a second lengthwise direction between a forward end and an aft end and wherein the second segment defines an outer side and an inner side, the forward end of the first segment pivotably coupled to the aft end of the second segment at a pivot axis at the respective outer sides of the first segment and the second segment, and the first segment moveable relative to the second segment between a bent position and a coupled position, the first lengthwise direction defining a coupled angle with the second lengthwise direction when the first segment is in the coupled position relative to the second segment;

an adjustment member operable with the first segment, the second segment, or both to adjust the coupled angle defined by the first lengthwise direction with the second lengthwise direction and wherein the adjustment member is coupled to the inner side of the first segment, the inner side of the second segment, or both; and a third segment extending along a third lengthwise direction between a forward end and an aft end, the forward end of the second segment pivotably coupled to the aft end of the third segment, the second segment moveable relative to the third segment between a bent position and a coupled position, the second lengthwise direction defining a coupled angle with the third lengthwise direction when the first segment is in the coupled position relative to the second segment.

7. The tool of claim 6, wherein the adjustment member is a first adjustment member, and wherein the tool further comprises:
a second adjustment member operable with the second segment, the third segment, or both to adjust the coupled angle defined by the second lengthwise direction with the third lengthwise direction.

8. The tool of claim 7, wherein the coupled angle defined by the first lengthwise direction with the second lengthwise direction is not equal to the coupled angle defined by the second lengthwise direction with the third lengthwise direction.

9. A method for inspecting an annular section of an engine using a tool comprising a plurality of segments and an adjustment member, the plurality of segments including a first segment and a second segment, wherein the first segment and second segment each respectively define an outer side and an inner side, the first segment and second being coupled at a pivot axis at the respective outer sides of the first segment and the second segment, and the adjustment member coupled to the inner side of the first segment, the inner side of the second segment, or both, the method comprising:
determining a control radius of the annular section of the engine; and
setting the adjustment member of the tool to adjust a coupled angle defined by the first segment relative to the second segment based on the determined control radius of the annular section of the engine.

10. The method of claim 9, wherein setting the adjustment member of the tool comprises setting a first adjustment member of the tool to adjust a first coupled angle defined by the first segment relative to the second segment, wherein the plurality of segments further includes a third segment and a fourth segment, and wherein setting the adjustment member of the tool comprises setting a plurality of adjustment members of the tool to further adjust a second coupled angle defined by the second segment relative to the third segment and a third coupled angle defined by the third segment relative to the fourth segment.

11. The method of claim 9, further comprising:
inserting the first and second segments into the annular section of the engine.

12. The method of claim 9, wherein determining the control radius of the annular section of the engine comprises determining an inspection radius of the annular section of the engine.

13. The method of claim 12, wherein setting the adjustment member of the tool comprises setting the adjustment member of the tool such that an average arc shape of the plurality of segments defines a radius of curvature substantially equal to the inspection radius of the annular section of the engine.

14. A tool for inspecting an annular section of an engine, the annular section of the engine defining an inspection radius, the tool comprising:
a plurality of segments moveably coupled to one another, wherein the plurality of segments each define an outer side and an inner side, the plurality of segments being coupled at a pivot axis at the respective outer sides of the segments, and an adjustment member coupled to the inner side of each of the plurality of segments, each segment moveable relative to an adjacent segment between a bent position and a coupled position, the plurality of segments defining an average arc shape when each segment is in its respective coupled position, the average arc shape defining a radius of curvature substantially equal to the inspection radius.

15. The tool of claim 14, further comprising:
an insertion tube defining a substantially 90 degrees bend, wherein the plurality of segments are moveable through the insertion tube, and wherein each segment is in the bent position when moved through the substantially 90 degree bend of the insertion tube.

16. The tool of claim 14, further comprising:
a biasing member operable with at least two segments of the plurality of segments, the biasing member configured to bias at least one segment of the at least two segments towards the coupled position.

17. A tool for inspecting an annular section of an engine, the tool comprising:
a first segment extending along a first lengthwise direction between a forward end and an aft end and wherein the first segment defines an outer side and an inner side;
a second segment extending along a second lengthwise direction between a forward end and an aft end and wherein the second segment defines an outer side and an inner side, the forward end of the first segment pivotably coupled to the aft end of the second segment at a pivot axis at the respective outer sides of the first segment and the second segment, and the first segment moveable relative to the second segment between a bent position and a coupled position, the first lengthwise direction defining a coupled angle with the second lengthwise direction when the first segment is in the coupled position relative to the second segment; and
an adjustment member operable with the first segment, the second segment, or both to adjust the coupled angle defined by the first lengthwise direction with the second lengthwise direction and wherein the adjustment member is coupled to the inner side of the first segment, the inner side of the second segment, or both, wherein the first segment defines a first indentation at the forward end and a second indentation at the forward end, wherein the adjustment member is positioned at least partially within the first indentation or the second indentation to adjust the coupled angle, and wherein the first indentation defines a first depth, wherein the second indentation defines a second depth, and wherein the first depth is not equal to the second depth.

18. The tool of claim 17, further comprising:
a biasing member operable with the first segment and the second segment to bias the first segment towards the coupled position relative to the second segment.

19. The tool of claim 17, further comprising:
an insertion tube defining a substantially 90 degree bend, wherein the first segment and the second segment are moveable through the insertion tube, and wherein the first segment is positioned in the bent position relative to the second segment when moved through the substantially 90 degree bend of the insertion tube.

20. A tool for inspecting an annular section of an engine, the tool comprising:
a first segment extending along a first lengthwise direction between a forward end and an aft end and wherein the first segment defines an outer side and an inner side;
a second segment extending along a second lengthwise direction between a forward end and an aft end and wherein the second segment defines an outer side and an inner side, the forward end of the first segment pivotably coupled to the aft end of the second segment at a pivot axis at the respective outer sides of the first segment and the second segment, and the first segment moveable relative to the second segment between a bent position and a coupled position, the first lengthwise direction defining a coupled angle with the second lengthwise direction when the first segment is in the coupled position relative to the second segment;
an adjustment member operable with the first segment, the second segment, or both to adjust the coupled angle defined by the first lengthwise direction with the second lengthwise direction and wherein the adjustment member is coupled to the inner side of the first segment, the inner side of the second segment, or both; and
an insertion tube defining a substantially 90 degree bend, wherein the first segment and the second segment are moveable through the insertion tube, and wherein the first segment is positioned in the bent position relative to the second segment when moved through the substantially 90 degree bend of the insertion tube.

21. The tool of claim 20, further comprising:
a biasing member operable with the first segment and the second segment to bias the first segment towards the coupled position relative to the second segment.

* * * * *